United States Patent Office

Re. 23,941
Reissued Feb. 8, 1955

23,941

TREATING RESIN GLUES AND PRODUCT PRODUCED

Carl F. MacLagan, Bainbridge, N. Y., and Lawrence Bradshaw, deceased, late of Bainbridge, N. Y., by The Borden Company, New York, N. Y., assignee No Drawing. Original No. 2,358,683, dated September 19, 1944, Serial No. 432,360, February 25, 1942. Application for reissue December 15, 1951, Serial No. 261,908

11 Claims. (Cl. 117—100)

Matter enclosed in heavy brackets [ ] appears in the original patent but forms no part of this reissue specification; matter printed in italics indicates the additions made by reissue.

During the last few years, glues and materials of an adhesive character have been used, to a substantial extent, containing water-soluble synthetic resins, notably water-soluble urea formaldehyde resin or water-soluble phenolic resin. For getting products which dissolve (or become dispersed) in water or aqueous liquids, it is advisable to employ the said resin in a very finely divided condition and particularly the spray-dried material has been found advantageous, the particles being perhaps somewhat porous and dissolving more readily than would be the case if the hard resin were simply comminuted, to a fine powder.

The fine powder obtained by spray-drying a solution (e. g. an aqueous solution) of synthetic resin (notably urea-formaldehyde resin), has certain undesirable physical properties: (1) it is very dusty, (2) it tends to cake together, (3) it tends to entrap air so that on mixing with water a foamy glue often results, (4) it tends to cling to the container and to the utensils (such as shovels or scoops) used in handling it, (5) it tends to lump when being mixed with water in proportions to form a spreadable fluid glue.

We have now found that these objectionable properties can be greatly reduced and often wholly eliminated by coating the particles of the powder with an oil (mineral, vegetable or animal) or an organic liquid having an oily character (for example tributyl phosphate, diethyl phthalate). In general "laying" a dust with oil is not new and it has heretofore been practiced to "oil" a dry glue base or the casein, seedmeal etc., used in making same. We believe, however, that it is a new discovery that the said water-soluble resin powder and oil are compatible, that the oiled powder is readily miscible with water and that the adhesive strength of the resin glue is not impaired by the small amount of oil or oil-like fluid required to prevent dusting. Further, by oiling the material the tendency to cake is very greatly lessened though not always entirely overcome by this treatment. The treated powder mixes more smoothly and more easily with water than the untreated powder, substantially without lumping or foaming.

In this connection it is called to attention, that the resins used in the present invention are of the type that are soluble in water. The term "soluble" does not necessarily imply that when the fine resin powder (alone or with other components of the glue) is mixed with water, all of said resin will thoroughly dissolve, but rather that a fluid spreadable smooth dispersion will be produced.

We are of course also aware that it has been proposed in molding some types of synthetic resins (with or without fillers, pigments, dyestuffs, etc.) to incorporate an oily component to plasticize the resin, to produce better molded products.

The powder is placed in a mixing vessel. The oil or oily liquid is sprayed or poured upon it with the mixer (which may be a tumbling barrel) running, and the mixing continued for twenty to thirty minutes or as long as may be required to give a thorough blending.

We prefer to use about 1% of the selected oil or oily-liquid or mixture of the same. The oil may be a mineral oil such as a dressing oil or light lubricating oil, a vegetable oil such as cottonseed oil, pine oil or oil of verbena, an animal oil such as sperm oil. Other oils which we have found to be satisfactory are the oils of cedar, citronella, lemongrass, sassafras and menhaden oil. A very suitable mineral oil is one having a specific gravity of 0.88, a Saybolt viscosity of about 105 at 100° F., and a flash point above 300° F. Or we may use an organic liquid which although not strictly an oil, possesses an oil-like character capable of performing the same function in abating the dust and otherwise improving the working qualities of the powder as recited above, e. g., tributyl phosphate or diethyl phthalate. A mixture of oils or a mixture of one or more oils with one or more organic liquids having the desired properties may also be used. The preferred oils are those which do not become rancid. The above oils and oily materials are insoluble (or at any event substantially insoluble) in water.

Some powders may require more or less than 1% of the oil. We may use from about 0.25% to 5% according to the nature of the powder but in most cases about 0.5 to 2.0% is suitable. We have found that an amount of oil up to about 5% of the weight of the powder does not substantially reduce the adhesive strength of the glue prepared from the resin powder.

We refer above to urea-formaldehyde resin, but we have also employed the above described process in the treatment of water-soluble phenolic resin powders for the same purpose, with marked success.

We desire to call attention to the fact that the oil applied is, by means of the agitation of the material (and if desired assisted by the fact of the oil being sprayed upon the mass of finely comminuted material consisting largely or wholly of the very fine spray-dried water-soluble synthetic resin, in very large part at least, spread out into the form of a very thin film on the particles of such resin). It is an important functional advantage also, that the application of the oil to the fine particles of the soluble resin, which already show a substantial tendency to cling to container walls and to tools (e. g. shovels and scoops) does not increase this tendency, but in fact greatly reduces the same. This is an important advantage of the present invention. In this connection, it may be noted that a similar oiling of powdered rosin would greatly increase its tendency to stick to surfaces.

As stated above, the untreated synthetic resin powder is very dusty. A dusty powder is objectionable in several ways. The dust raised in handling, for example in packing the powder or in transferring the powder from the container to the glue pot or glue mixing machine, tends to float in the air and to be carried to a distance before settling, thus contaminating the whole workroom. It settles on the workmen's skin and may set up an irritation due to the formaldehyde or other chemical and may cause itching or irritation or even acute dermatitis. It is also troublesome if inhaled, the phenolic resin powders being especially objectionable in this respect. The process of oiling the powder as described herein, mitigates the dispersal of dust in the air and its attendant nuisance and loss.

Secondly, the untreated powders tend to agglomerate or cake together in storage and the agglomerations form lumps and do not readily dissolve, when added to water in preparing the liquid glue. This tendency is partially offset by the oiling treatment, so that a uniform liquid glue is produced. (There are other methods of reducing the caking of the powder, which however form no part of the present invention. One of these other methods, namely that of adding a substantially inert mineral powder may actually increase the dustiness, which in turn can be reduced by oiling as described.)

Further, the untreated powders when dropped on the surface of water in the mixer in preparing the liquid glues tend to form clusters (consisting of a core of dry or imperfectly wetted powder surrounded by an envelope of partly dissolved resin). The oiled powders however resist wetting momentarily, so that in the present invention the grains are scattered throughout the liquid and dissolve without clustering, providing a more uniform mix free from lumps. The oiled powders also release trapped air more readily, so that there is less tendency to produce foamy glues.

For the purpose of more completely explaining how the present invention is to be performed, we give the following examples, to which the invention is not restricted.

EXAMPLE 1

100 pounds of a synthetic resin powder prepared for example by spray-drying an aqueous solution of a urea formaldehyde resin, and containing about 5% of residual moisture, is charged into a suitable mixer such as a tumbler or spiral mixing device. While operating the mixer, about one-half pound of oil of cedar is sprayed on to the powder and the mixing is continued for about 20 minutes. The oiled powder is then ready for use or may be packaged and stored.

EXAMPLE 2

100 pounds of a water-soluble phenol-formaldehyde resin powder is placed in a vessel provided with efficient mixing blades. With the mixer running, about one-half pound of a thin mineral oil having, for example, a specific gravity of about 0.88 and a viscosity of about 105 Saybolt, is allowed to drop on to the powder at room temperature. After the oil has been added the mixing is continued for about 30 minutes to obtain a thorough blending. The oiled powder is then ready for being dissolved in water.

The powdery mixtures so produced are suitable for mixing with water to form liquid glues, without lumping or foaming.

EXAMPLE 3

Like Example 1, but instead of the resin alone, we can use a mixture of 4 parts of the resin with 1 part of wheat flour or wood flour (these proportions can be varied substantially, and/or other components can be added if desired).

We claim:

1. In handling dry comminuted potentially adhesive material containing a substantial amount of a water-soluble synthetic resin in finely divided dust-forming condition, the herein described improvement which comprises applying thereto a small percentage of a fluid oily liquid which is substantially insoluble in water, and spreading out said oily liquid, at least in large part into the form of films carried upon the said fine particles, whereby the tendency to form dust and the tendency to cling to containers and tools are greatly reduced, and the said finely divided resin becomes more easily miscible with aqueous diluents.

2. A process of treating spray-dried water-soluble urea-formaldehyde resin in a finely divided state, which comprises adding to the same not over 5% of a substantially water-insoluble fluid oily material, and spreading out said fluid oily material, at least in large part, into the form of films on said finely divided resin.

3. A glue base which contains a substantial amount of a water-soluble synthetic resin in a finely divided condition, such base being coated with not substantially more than 5% of a fluid water-insoluble oily material, such oily material being, in large part at least, spread out in the form of films on the finely divided powder, and which glue base can be uniformly mixed with water more easily than could the said finely divided powder without the oily material being added thereto.

4. A glue base which contains a substantial amount of a water-soluble urea-formaldehyde resin in a finely divided condition, such base being coated with not substantially more than 5% of a water-insoluble fluid oily material, such oily material being, in large part at least, spread out in the form of films on the particles of such finely divided powder, and which glue base can be uniformly mixed with water more easily than could the said finely divided powder without the oily material being added thereto.

*5. In handling dry comminuted potentially adhesive material containing a substantial amount of a water-soluble synthetic resin in finely divided dust-forming condition, the herein described improvement which comprises applying thereto a small percentage of a fluid oily liquid which is substantially insoluble in water, comprising terpineol, and spreading out said oily liquid, at least in large part into the form of films carried upon the said fine particles, whereby the tendency to form dust and the tendency to cling to containers and tools are greatly reduced, and the said finely divided resin becomes more easily miscible with aqueous diluents.*

*6. In handling dry comminuted potentially adhesive material containing a substantial amount of a water-soluble synthetic resin in finely divided dust-forming condition, the herein described improvement which comprises applying thereto a small percentage of a fluid oily liquid which is substantially insoluble in water, comprising tributyl phosphate, and spreading out said oily liquid, at least in large part into the form of films carried upon the said fine particles, whereby the tendency to form dust and the tendency to cling to containers and tools are greatly reduced, and the said finely divided resin becomes more easily miscible with aqueous diluents.*

*7. In handling dry comminuted potentially adhesive material containing a substantial amount of a water-soluble synthetic resin in finely divided dust-forming condition, the herein described improvement which comprises applying thereto a small percentage of a fluid oily liquid which is substantially insoluble in water, comprising diethyl phthalate, and spreading out said oily liquid, at least in large part into the form of films carried upon the said fine particles, whereby the tendency to form dust and the tendency to cling to containers and tools are greatly reduced, and the said finely divided resin becomes more easily miscible with aqueous diluents.*

*8. In handling dry comminuted potentially adhesive material containing a substantial amount of a water-soluble synthetic resin in finely divided dust-forming condition, the herein described improvement which comprises applying thereto a small percentage of a fluid oily liquid which is substantially insoluble in water, comprising cottonseed oil, and spreading out said oily liquid, at least in large part into the form of films carried upon the said fine particles, whereby the tendency to form dust and the tendency to cling to containers and tools are greatly reduced, and the said finely divided resin becomes more easily miscible with aqueous diluents.*

*9. In handling dry comminuted potentially adhesive material containing a substantial amount of a water-soluble synthetic resin comprising phenol formaldehyde condensate in finely divided dust-forming condition, the herein described improvement which comprises applying thereto a small percentage of a fluid oily liquid which is substantially insoluble in water, and spreading out said oily liquid, at least in large part into the form of films carried upon the said fine particles, whereby the tendency to form dust and the tendency to cling to containers and tools are greatly reduced, and the said finely divided resin becomes more easily miscible with aqueous diluents.*

*10. In handling dry comminuted potentially adhesive material containing a substantial amount of a water-soluble synthetic resin comprising urea-formaldehyde condensate in finely divided dust-forming condition, the herein described improvement which comprises applying thereto a small percentage of a fluid oily liquid which is substantially insoluble in water, and spreading out said oily liquid, at least in large part into the form of films carried upon the said fine particles, whereby the tendency to form dust and the tendency to cling to containers and tools are greatly reduced, and the said finely divided resin becomes more easily miscible with aqueous diluents.*

*11. In handling dry comminuted potentially adhesive material containing a substantial amount of a water-soluble synthetic resin comprising urea-formaldehyde resin in finely divided dust-forming condition, the herein described improvement which comprises applying thereto a small percentage of a fluid oily liquid which is substantially insoluble in water, comprising pine oil, and spreading out said oily liquid, at least in large part into the form of films carried upon the said fine particles, whereby*

*the tendency to form dust and the tendency to cling to containers and tools are greatly reduced, and the said finely divided resin becomes more easily miscible with aqueous diluents.*

References Cited in the file of this patent or the original patent

UNITED STATES PATENTS

| | | |
|---|---|---|
| 1,979,380 | Gardner | Nov. 6, 1934 |
| 2,056,458 | Howald | Oct. 6, 1936 |
| 2,162,690 | Anderson | June 20, 1939 |
| 2,245,040 | Marks | June 10, 1941 |
| 2,358,683 | Bradshaw et al. | Sept. 19, 1944 |
| 2,535,020 | Stephan | Dec. 19, 1950 |

FOREIGN PATENTS

| | | |
|---|---|---|
| 534,095 | Great Britain | Feb. 27, 1941 |